(12) United States Patent
Matsumori et al.

(10) Patent No.: US 9,470,930 B2
(45) Date of Patent: Oct. 18, 2016

(54) ORIENTATION FILM MATERIALS AND LIQUID CRYSTAL DISPLAY DEVICE USING IT

(71) Applicant: Japan Display Inc., Tokyo (JP)

(72) Inventors: Masaki Matsumori, Tokyo (JP); Shuji Imazeki, Tokyo (JP); Yasushi Tomioka, Tokyo (JP); Noboru Kunimatsu, Tokyo (JP)

(73) Assignee: Japan Display Inc., Tokyo (JP)

( * ) Notice: Subject to any disclaimer, the term of this patent is extended or adjusted under 35 U.S.C. 154(b) by 37 days.

(21) Appl. No.: 14/475,845

(22) Filed: Sep. 3, 2014

(65) Prior Publication Data

US 2015/0062520 A1    Mar. 5, 2015

(30) Foreign Application Priority Data

Sep. 3, 2013 (JP) ................................ 2013-182146

(51) Int. Cl.
C09K 19/00 (2006.01)
G02F 1/1337 (2006.01)
G02F 1/1343 (2006.01)

(52) U.S. Cl.
CPC ... G02F 1/133723 (2013.01); *B32B 2457/202* (2013.01); *G02F 1/134363* (2013.01); *Y10T 428/10* (2015.01); *Y10T 428/1005* (2015.01)

(58) Field of Classification Search
CPC .................. G02F 1/133711; G02F 1/133723; G02F 1/13378; Y10T 428/10; Y10T 428/1005; Y10T 428/1018; Y10T 428/1023; B32B 2457/202; C08L 79/08; C08L 77/06; C08L 77/10
USPC ......... 428/1.1, 1.2, 1.25, 1.26; 349/123, 135
See application file for complete search history.

(56) References Cited

U.S. PATENT DOCUMENTS

| 8,648,988 B2 | 2/2014 | Kunimatsu et al. |
| 2005/0271833 A1* | 12/2005 | Matsumori ....... G02F 1/134363 428/1.25 |
| 2011/0109857 A1* | 5/2011 | Imanishi et al. .............. 349/129 |

FOREIGN PATENT DOCUMENTS

JP    2011-170031    9/2011

* cited by examiner

*Primary Examiner* — Ruiyun Zhang
(74) *Attorney, Agent, or Firm* — Typha IP LLC

(57) ABSTRACT

Various layer separation states are generated by the combination of a polyamide acid ester and a polyamide acid and a long residual image characteristic cannot be further improved merely by combining them. A liquid crystal display device comprises a substrate, a liquid crystal layer, and an orientation film placed between the substrate and the liquid crystal layer. The orientation film comprises a polyimide precursor having two or more components. In the polyimide precursor, an octanol-water partition coefficient is defined as log P and the difference in log P (Δ log P) between the two components having most distant log Ps is set so as to fall within a prescribed range.

13 Claims, 2 Drawing Sheets

ORIENTATION FILM MATERIALS AND LIQUID CRYSTAL DISPLAY DEVICE USING IT

CLAIM OF PRIORITY

The present application claims priority from Japanese patent application JP2013-182146 filed on Sep. 3, 2013, the content of which is hereby incorporated by reference into this application.

BACKGROUND

The present disclosure relates to an orientation film material and is applicable to a liquid crystal display device having a photo-orientation film for example.

Display in a liquid crystal display device is carried out by applying an electric field to liquid crystal molecules in a liquid crystal layer interposed between a pair of substrates, thereby changing the orientation directions of the liquid crystal molecules, and thus changing the optical characteristic of the liquid crystal layer. In a liquid crystal display device, an orientation control film having a liquid crystal orientation control capability is formed at each of the interfaces between a liquid crystal layer and a pair of substrates holding the liquid crystal layer in between. The orientation control film comprises an organic film such as a polyimide film or the like and is also described as an orientation film.

Japanese Published Unexamined Application No. 2011-170031 (Patent Literature 1) or U.S. Pat. No. 8,648,988 (Patent Literature 2) corresponding to it discloses that an orientation film has a two-layered structure comprising a photo-orientation film and a high film-strength orientation film. It is disclosed that the photo-orientation film is formed by using a polyamide acid ester containing the polyamide acid ester having a cyclobutane by not less than 80% as a precursor and the high film-strength orientation film is formed by using a polyamide acid as a precursor.

SUMMARY

A polyamide acid ester has photo-orientation and copes with a residual image caused by a liquid crystal torque load. Meanwhile, a polyamide acid has a low resistance and copes with a residual image caused by electrical charge accumulation to an orientation film. The present inventors have found that various layer separation states are generated by the combination of a polyamide acid ester and a polyamide acid and a long residual image characteristic cannot be further improved merely by combining them.

Other problems and novel features will be obvious from the descriptions in the present disclosure and the attached drawings.

The representative outline of the present disclosure is briefly explained as follows.

A liquid crystal display device has an orientation film containing a polyimide precursor having two or more components. In the polyimide precursor, an octanol-water partition coefficient is defined as log P and the difference in log P ($\Delta \log P$) between the two components having most distant log Ps is set so as to fall within a prescribed range.

Such a liquid crystal display device makes it possible to improve a long residual image characteristic.

DESCRIPTION OF THE PREFERRED EMBODIMENTS

Figure 3:
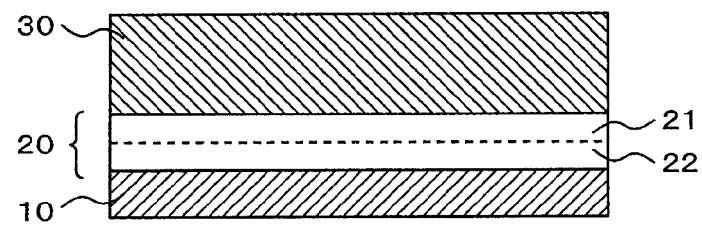
FIG. 3 is a schematic sectional view of an orientation film.

FIG. 3 is a schematic sectional view of an orientation film (an alignment film). A photo-orientation film 20 is formed by printing a photo-orientation film material formed by blending and varnishing a polyamide acid ester and a polyamide acid on a substrate 10 (actually, wires, electrodes, insulation films, etc. are formed but they are not shown here) and applying the treatments of vertical two-layer separation, light irradiation, heating and imidization, and others. Here, since a polyamide acid has a higher polarity than a polyamide acid ester and has a good affinity with an ITO (Indium Tin Oxide) and an organic passivation film, always a polyamide acid 22 forms the lower layer and a polyamide acid ester 21 forms the upper layer. Further, a liquid crystal layer 30 is formed over the orientation film.

Various layer separation states are generated by the combination of a polyamide acid ester and a polyamide acid and a long residual image characteristic cannot be further improved merely by combining them. To cope with that, the present inventors have studied to improve a long residual image characteristic by increasing the surface layer transition rate of a polyamide acid ester. As a result, it has been found that a long residual image characteristic can be improved by controlling the difference between the log P(E) of a polyamide acid ester and the log P(A) of a polyamide acid, namely $\Delta \log P = \log P(E) - \log P(A)$, within a prescribed range. Here, a log P value (octanol-water partition coefficient) is a dimensionless number acting as an index representing the hydrophobicity and transitivity of a chemical substance. When a log P is small, hydrophilicity is secured and, in the case where an ITO or an SiN (silicon nitride) is formed over the surface of a substrate, the ITO or the SiN is hydrophilic and hence a polyamide acid is formed on the lower layer (substrate) side. When a log P is large, hydrophobicity is secured and a polyamide acid ester is formed on the upper layer side (the other side of the substrate).

When the difference in log P ($\Delta \log P$) between the two components of a polyamide acid ester and a polyamide acid falls within a prescribed range, a good layer separation state is obtained. When a $\Delta \log P$ is smaller than a value in the prescribed range, the two components of a polyamide acid ester and a polyamide acid are mixed with each other completely. When a $\Delta \log P$ is larger than a value in the prescribed range, surface unevenness is caused undesirably and not a vertically layered state but another phase separation state is caused.

<Octanol-Water Partition Coefficient>

An octanol-water partition coefficient (log P value) can be measured by a shake flask method described in JIS (Japanese Industrial Standards) Z7260-107 (2000). Otherwise, an octanol-water partition coefficient (log P value) can be estimated by a computational chemical method as described in JIS (Japanese Industrial Standards) Z7260-117 (2006).

In the present disclosure, a log P value computed by the following expression described in Technical Literature 2 on the basis of an organic nature (i) and an inorganic nature (o) described in Technical Literature 1 is used;

$$\log P = 0.011 \Sigma o - 0.00067 \Sigma i - 0.905 (\Sigma i / \Sigma o) + 0.995.$$

Technical Literature 1: Shirou Sato, Technical Information of Shizuoka Prefectural Institute of Public Health and Environmental Science, 5(3), 1(1987)

Technical Literature 2: "Organic Conceptual Diagram, Foundation and Application, New Edition" SANKYO PUBLISHING Co., Ltd. (2008)

When a partition coefficient at the A part is represented by PA and a partition coefficient at the B part is represented by PB in the following chemical formula (1), the partition coefficient of a polymer comes to be PA+PB.

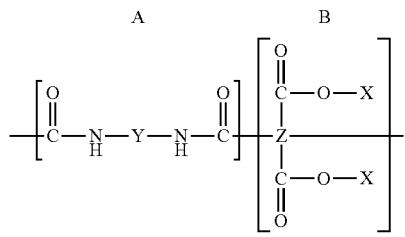
(1)

Here, X represents a hydrogen atom or an alkyl group, Y represents a divalent organic group, and Z represents a tetravalent organic group.

In a copolymer where Y comprises two components of $Y_1$ ($m_1$ mol %) and $Y_2$ ($m_2$ mol %) and Z comprises two components of $Z_1$ ($n_1$ mol %) and $Z_2$ ($n_2$ mol %), the log P value of the polymer is represented by the following expression;

$$\mathrm{Log}\ P = (m_1/100)*PA_1 + (m_2/100)*PA_2 + (n_1/100)*PB_1 + (n_2/100)*PB_2.$$

Here,
$m_1 + m_2 = 100$
$n_1 + n_2 = 100$
$PA_1$: log P when Y comprises $Y_1$
$PA_2$: log P when Y comprises $Y_2$
$PB_1$: log P when Z comprises $Z_1$
$PB_2$: log P when Z comprises $Z_2$.

In a copolymer where Y comprises u components of $Y_i$ ($m_i$ mol %) ... and Z comprises v components of $Z_i$ ($n_i$ mol %) ..., the log P value of the polymer is represented by the following expression;

$$\log P = \sum_{i=1}^{u} \{(m_i/100)*PA_i\} + \sum_{i=1}^{v} \{(n_i/100)*PB_i\}$$

Here, $$\sum_{i=1}^{u} m_i = 100 \sum_{i=1}^{v} n_i = 100$$

$PA_i$: log P when Y comprises $Y_i$
$PB_i$: log P when Z comprises $Z_i$.

<Polyamide Acid>

The molecular formula of a polyamide acid is represented by the following chemical formula (2);

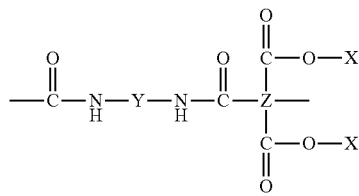
(2)

Here, X represents a hydrogen atom (—H). Further, for example, Y is a substance represented by the following chemical formulae (Y1) and (Y2) and Z is a substance represented by the following chemical formulae (Z1) and (Z2);

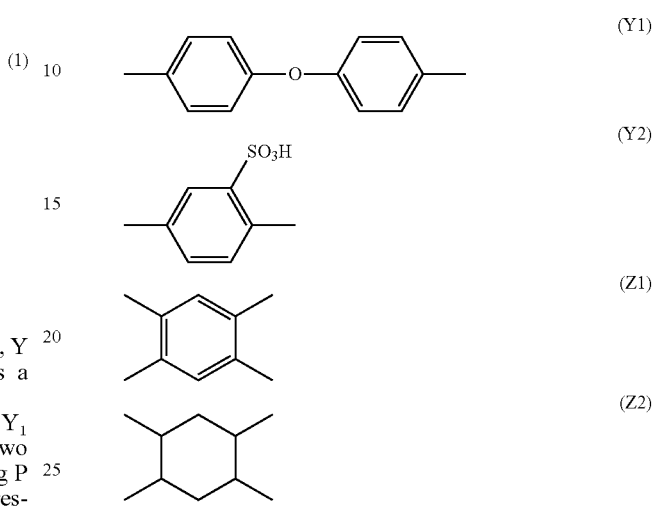

Results obtained by computing Δ log Ps of polyamide acids formed by combining the chemical formula (2) with the chemical formulae (Y1) and (Y2) and the chemical formulae (Z1) and (Z2) are shown in Table 1.

TABLE 1

| Polyamide acid | Y1 | Y2 | Z1 | Z2 | logP (A) |
|---|---|---|---|---|---|
| A-1 | 80 | 20 | 10 | 90 | 2.36 |
| A-2 | 60 | 40 | 10 | 90 | 1.60 |
| A-3 | 40 | 60 | 10 | 90 | 0.85 |
| A-4 | 20 | 80 | 10 | 90 | 0.09 |
| A-5 | 0 | 100 | 10 | 90 | −0.66 |

<Polyamide Acid Ester>

The molecular formula of a polyamide acid ester is represented by the chemical formula (2). Here, X represents an alkyl group (—CH3). Further, for example, Y is a substance represented by the following chemical formulae (Y3) and (Y4) and Z is a substance represented by the following chemical formulae (Z3) and (Z4);

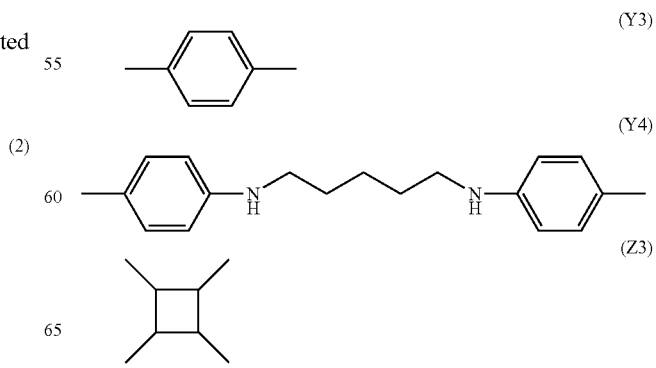

-continued

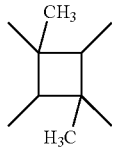

(Z4)

Results obtained by computing Δ log Ps of polyamide acid esters formed by combining the chemical formula (2) with the chemical formulae (Y3) and (Y4) and the chemical formulae (Z3) and (Z4) are shown in Table 2.

TABLE 2

| Polyamide acid ester | Y3 | Y4 | Z3 | Z4 | logP (E) |
|---|---|---|---|---|---|
| E-1 | 100 | 0 | 50 | 50 | 2.07 |
| E-2 | 95 | 5 | 50 | 50 | 2.19 |
| E-3 | 90 | 10 | 50 | 50 | 2.32 |
| E-4 | 85 | 15 | 50 | 50 | 2.45 |
| E-5 | 80 | 20 | 50 | 50 | 2.58 |

A liquid crystal display device according to an embodiment comprises substrates, a liquid crystal layer, and orientation films placed between the substrates and the liquid crystal layer. Each of the orientation films comprises a polyimide precursor having two or more components and is formed so as to satisfy the relational expression $1.20<\Delta \log P<2.50$ when the difference in log P between the two components having most distant log Ps is defined as $\Delta \log P$ in the precursor.

Desirably, the relational expression $1.30<\Delta \log P<2.00$ is satisfied. More desirably, the relational expression $1.40<\Delta \log P<1.80$ is satisfied.

A polyimide precursor desirably contains a polyamide acid ester and a polyamide acid. An orientation film is desirably given a liquid crystal orientation capability by being irradiated with polarized ultraviolet light. A polyamide acid ester desirably contains a cyclobutane ring.

An orientation film material according to an embodiment, namely an orientation film composition, comprises a polyimide precursor having two or more components containing a polyamide acid and a polyamide acid ester and is formed so as to satisfy the relational expression $1.20<\Delta \log P<2.50$ when the difference in log P between the two components having most distant log Ps is defined as $\Delta \log P$ in the precursor.

Desirably, the relational expression $1.30<\Delta \log P<2.00$ is satisfied. More desirably, the relational expression $1.40<\Delta \log P<1.80$ is satisfied.

In a liquid crystal display device and an orientation film composition according to an embodiment, since a polyamide acid ester and a polyamide acid are in a good layer separation state, it is possible to improve a long residual image characteristic.

Examples are explained hereunder in reference to drawings. Here, in the following explanations, an identical constituent component is represented by an identical symbol and the repetition of explanation is avoided. Here, in the examples, the explanations are made on the basis of an IPS-system liquid crystal display device but are not limited to the application, and may be based on any liquid crystal display device as long as it has an orientation film.

EXAMPLE

Figure 1:
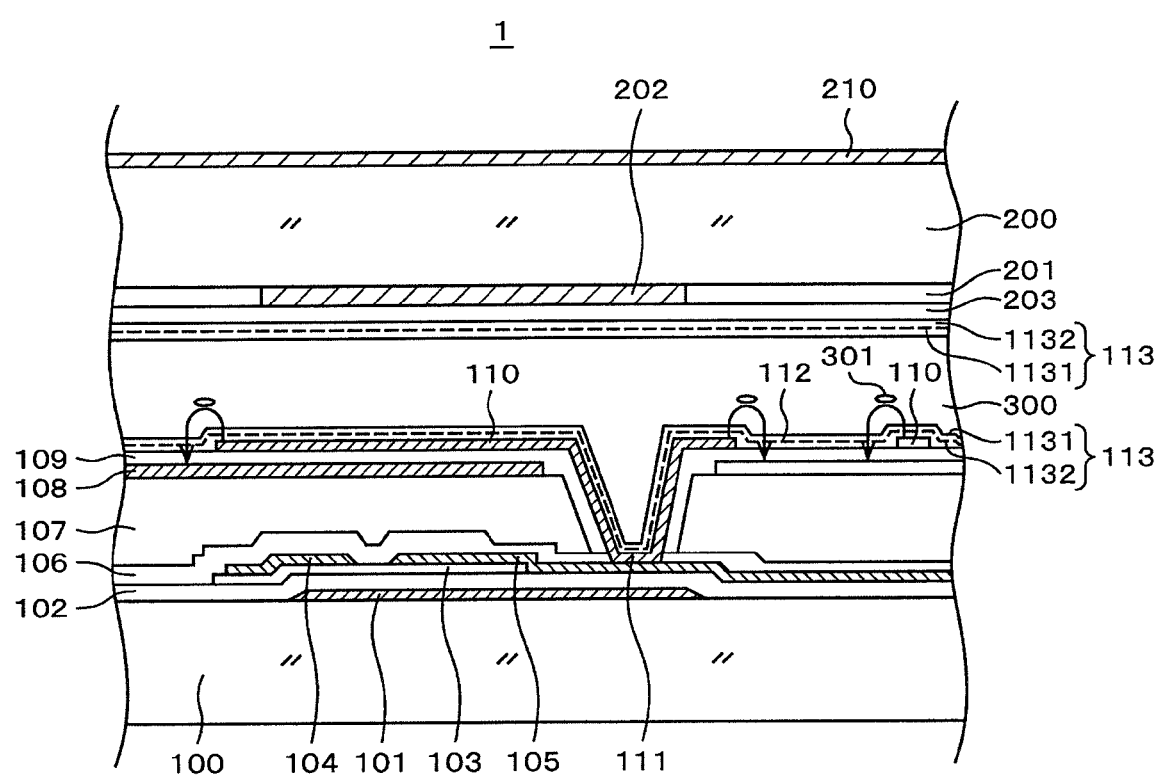
FIG. 1 is a sectional view showing a structure in a display region of a liquid crystal display device according to an example.

FIG. 1 is a sectional view showing a structure in a display region of a liquid crystal display device according to an example. A liquid crystal display device 1 is an IPS-system liquid crystal display device and, in the structure, a pectinate pixel electrode 110 is formed over an opposite electrode 108 formed planarly solidly in the manner of interposing an insulation film in between. Then an image is formed by rotating liquid crystal molecules 301 by an electric voltage between the pixel electrode 110 and the opposite electrode 108 and controlling a light transmission rate of a liquid crystal layer 300 at each of pixels. The structure of FIG. 1 is hereunder explained in detail. Here, although explanations are made on the basis of the configuration of FIG. 1 in the present example, the explanations can be applied also to a liquid crystal display device other than the liquid crystal display device of FIG. 1.

In FIG. 1, a gate electrode 101 is formed over a TFT substrate 100 comprising glass. The gate electrode 101 comprises a metal layer of the same layer as a scanning line. The gate electrode 101 is covered with an insulation film 102 comprising SiN. A semiconductor layer 103 is formed at a position facing the gate electrode 101 over the insulation film 102. The semiconductor layer 103 forms the channel section of a TFT and a source electrode 104 and a drain electrode 105 are formed over the semiconductor layer 103 in the manner of interposing the channel section. A picture signal line is commonly used as the source electrode 104 and the drain electrode 105 is connected to a pixel electrode 110. Both the source electrode 104 and the drain electrode 105 are formed simultaneously by the same metal layer.

The TFT is covered with an inorganic passivation film 106 comprising SiN. The inorganic passivation film 106 protects particularly the channel section of the TFT against impurities. An organic passivation film 107 comprising a polyimide resin or the like is formed over the inorganic passivation film 106. The organic passivation film 107 is formed so as to be thick since it also plays a role of planarizing the surface of the TFT together with the role of protecting the TFT. An opposite electrode 108 is formed over the organic passivation film 107. The opposite electrode 108 is covered with an insulation film 109 comprising SiN. The pixel electrode 110 is formed in the manner of covering the insulation film 109 and a through hole 111. At the through hole 111, the drain electrode 105 extending from the TFT communicates with the pixel electrode 110 and a picture signal is supplied to the pixel electrode 110. The opposite electrode 108 and the pixel electrode 110 comprise an ITO of a transparent conductive film.

Figure 2:
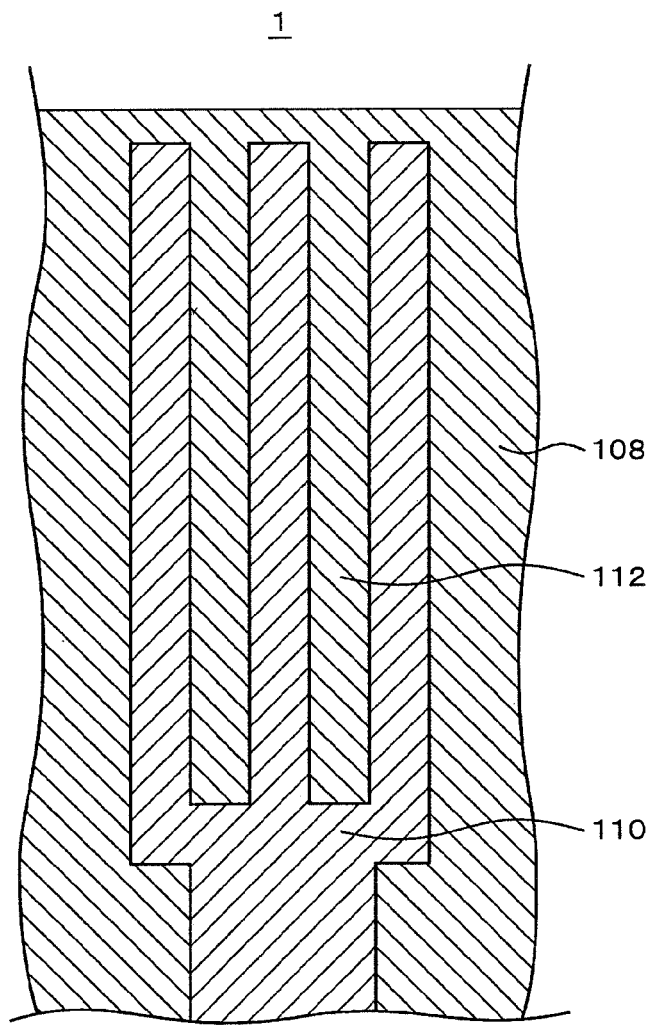
FIG. 2 is a plan view showing a pixel electrode.

An example of a pixel electrode 110 is shown in FIG. 2. The pixel electrode 110 is a pectinate electrode. A slit 112 is formed between a tooth and another tooth. A planar opposite electrode 108 is formed below the pixel electrode 110. When a picture signal is applied to the pixel electrode 110, a liquid crystal molecule 301 rotates by an electric field generated between the pixel electrode 110 and the opposite electrode 108 through the slit 112. Light passing through a liquid crystal layer 300 is controlled thereby and an image is formed.

FIG. 1 is a sectional view explaining the situation. As shown in FIG. 1, a slit 112 is formed between a pectinate electrode and another pectinate electrode. A constant voltage is applied to an opposite electrode 108 and a voltage by a picture signal is applied to a pixel electrode 110. When a voltage is applied to the pixel electrode 110, as shown in FIG. 1, an electrical flux line is generated, a liquid crystal molecule 301 rotates in the direction of the electrical flux line, and the transmission of light from backlight is controlled. An image is formed since transmission from backlight is controlled at each of pixels.

In the example of FIG. 1, a planarly formed opposite electrode 108 is placed over an organic passivation film 107 and a pectinate electrode 110 is placed over an insulation film 109. Inversely however, a planarly formed pixel electrode 110 is placed over an organic passivation film 107 and a pectinate opposite electrode 108 is placed over an insulation film 109 in some cases.

An orientation film (An alignment film) 113 for orienting the liquid crystal molecule 301 is formed over the pixel electrode 110. In the present example, the orientation film 113 has a two-layered structure comprising a photo-orientation film 1131 touching the liquid crystal layer 300 and a high film-strength orientation film 1132 formed under the photo-orientation film 1131 (on the side of a substrate). The photo-orientation film 1131 comprises a polyamide acid ester and the high film-strength orientation film 1132 comprises a polyamide acid. Here, a low-resistance orientation film represented by 1132 is an organic film not directly touching a liquid crystal and does not directly relate to the initial orientation of a liquid crystal but is called an orientation film in the present specification for convenience sake.

In FIG. 1, an opposite substrate 200 is placed in the manner of interposing the liquid crystal layer 300. A color filter 201 is formed inside the opposite substrate 200. The color filter 201 comprises red, green, and blue color filters 201 at each pixel and a color image is formed. A black matrix 202 is formed between a color filter 201 and another color filter 201 and the contrast of an image is intensified. The black matrix 202 also plays a role as the light shielding film of a TFT and prevents photocurrent from flowing into the TFT.

An overcoat film 203 is formed in a manner of covering the color filter 201 and the black matrix 202. The surfaces of the color filter 201 and the black matrix 202 are uneven and thus the surfaces are planarized by the overcoat film 203.

An orientation film 113 for deciding the initial orientation of a liquid crystal is formed over the overcoat film 203. The orientation film 113 on the opposite substrate side also has a two-layered structure comprising a photo-orientation film 1131 touching the liquid crystal layer 300 and a low-resistance orientation film 1132 formed under the photo-orientation film 1131 in the same manner as the orientation film 113 on the TFT substrate side. Here, since the liquid crystal display device 1 is an IPS system, the opposite electrode 108 is formed on the side of the TFT substrate 100 but is not formed on the side of the opposite substrate 200.

As shown in FIG. 1, in IPS, a conductive film is not formed inside the opposite substrate 200. The electric potential of the opposite substrate 200 is therefore destabilized. Further, electromagnetic noise intrudes into the liquid crystal layer 300 from outside and influences an image. In order to avoid such a problem, a surface conductive film 210 is formed outside the opposite substrate 200.

A polyamide acid shown in Table 1 and a polyamide acid ester shown in Table 2 are blended at a ratio of 50 to 50. An orientation film material formed by blending and varnishing the polyamide acid and the polyamide acid ester with an organic solvent is printed, dried, separated vertically into two layers, and subjected to light irradiation, heating, and imidization, and thus an orientation film is formed. A liquid crystal display device is manufactured by using the orientation film and a long residual image characteristic is evaluated.

The burning of an image and the residual image of the liquid crystal display device according to the present example are measured quantitatively and evaluated by using an oscilloscope formed by combining photodiodes. Firstly, a window pattern is displayed on a screen at a maximum brightness for 200 hours, successively the whole screen is switched to halftone display where a residual image is most distinguished, so that the brightness may be 10% of the maximum brightness in this case, and the time period until the pattern at the edge part in the window pattern disappears is evaluated as a residual image disappearance time. A residual image disappearance time allowed here is not more than 5 minutes. The results are shown in Table 3.

TABLE 3

| Orientation film No. | Orientation film material | | $\Delta \log P$ | Residual image disappearance time (min.) |
|---|---|---|---|---|
| | Polyamide acid | Polyamide acid ester | | |
| 1 | A-1 | E-1 | −0.29 | 60 |
| 2 | A-2 | E-1 | 0.47 | 30 |
| 3 | A-3 | E-1 | 1.22 | 5 |
| 4 | A-4 | E-1 | 1.97 | 3 |
| 5 | A-5 | E-1 | 2.73 | 10 |
| 6 | A-1 | E-2 | −0.16 | 50 |
| 7 | A-2 | E-2 | 0.59 | 30 |
| 8 | A-3 | E-2 | 1.35 | 3 |
| 9 | A-4 | E-2 | 2.10 | 5 |
| 10 | A-5 | E-2 | 2.86 | 15 |
| 11 | A-1 | E-3 | −0.03 | 40 |
| 12 | A-2 | E-3 | 0.72 | 25 |
| 13 | A-3 | E-3 | 1.47 | 1 |
| 14 | A-4 | E-3 | 2.23 | 5 |
| 15 | A-5 | E-3 | 2.98 | 15 |
| 16 | A-1 | E-4 | 0.09 | 35 |
| 17 | A-2 | E-4 | 0.85 | 20 |
| 18 | A-3 | E-4 | 1.60 | 1 |
| 19 | A-4 | E-4 | 2.36 | 5 |
| 20 | A-5 | E-4 | 3.11 | 20 |
| 21 | A-1 | E-5 | 0.22 | 30 |
| 22 | A-2 | E-5 | 0.97 | 15 |
| 23 | A-3 | E-5 | 1.73 | 1 |
| 24 | A-4 | E-5 | 2.48 | 5 |
| 25 | A-5 | E-5 | 3.24 | 25 |

In the orientation films 3, 4, 8, 9, 13, 14, 18, 19, 23, and 24, good long residual image characteristics are obtained. The $\Delta \log P$ values of the orientation films having long residual image characteristics showing residual image disappearance times of not more than 5 minutes are in the range of 1.22 to 2.48 (here, nearly identical results are obtained even in the range of 1.2 to 2.5). Further, the $\Delta \log P$ values of the orientation films having long residual image characteristics showing residual image disappearance times of not more than 3 minutes are in the range of 1.35 to 1.97 (here, nearly identical results are obtained even in the range of 1.3 to 2.0). The $\Delta \log P$ values of the orientation films having long residual image characteristics showing residual image disappearance times of not more than 1 minute are in the range of 1.47 to 1.73 (here, nearly identical results are obtained even in the range of 1.4 to 1.8). In an orientation film having a good long residual image characteristic, the layer separation state of a polyamide acid ester and a polyamide acid is good and the polyamide acid ester constitutes a photo-orientation film 1131 and the polyamide acid constitutes a low-resistance orientation film 1132.

Further, it is found that a long residual image characteristic in the case of blending another orientation film component to an orientation film composition comprising a polyamide acid and a polyamide acid ester depends on $\Delta \log$ P of the most distant two components in log P(A) and log P(E) of the blended three kinds.

For example, when E-3 is blended as the third orientation film component to the orientation film composition (A-3 and E-1) of the orientation film 3, the residual image disappearance time is 1 minute.

Although the case where the blend ratio of a polyamide acid to a polyamide acid ester is 50/50 is shown in the present example, the similar effects are confirmed also in other blend ratios (10/90 to 90/10). Further, although a photo-orientation treatment is used as the orientation treatment method in the present example, the similar effects are confirmed also in the case where an orientation film formed by an orientation film material according to the present applied invention is subjected to a rubbing orientation treatment.

Although the invention established by the present inventors has heretofore been explained concretely on the basis of the embodiments and the examples, it goes without saying that the present invention is not limited to the embodiments and the examples and can be modified variously.

What is claimed is:

1. A liquid crystal display device comprising
a substrate,
a liquid crystal layer, and
an orientation film placed between the substrate and the liquid crystal layer, wherein
the orientation film comprises a polyimide formed from a polyimide precursor having at least a first component and a second component, and
in the polyimide precursor, when an octanol-water partition coefficient is defined as log P and the difference in log P between the first component and the second component having most distant log Ps are defined as Δ log P, the relational expression 1.20<Δ log P<2.50 is satisfied,
wherein the polyimide precursor contains a polyamide acid ester and a polyamide acid,
the first component and the second component includes a structure represented by the following chemical formula (1),

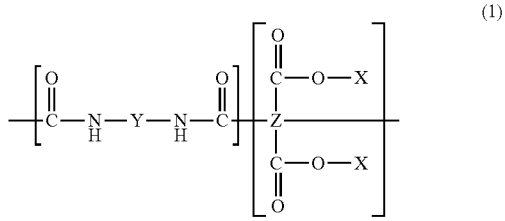

(1)

X represents a hydrogen atom or an alkyl group, Y represents a divalent organic group, and Z represents a tetravalent organic group, and
the first component contains the following chemical formula (Z4) as the Z of the chemical formula (1)

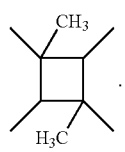

(Z4)

2. The liquid crystal display device according to claim 1, wherein the relational expression 1.30<Δ log P<2.00 is satisfied.

3. The liquid crystal display device according to claim 2, wherein the relational expression 1.40<Δ log P<1.80 is satisfied.

4. The liquid crystal display device according to claim 1, wherein the orientation film is given a liquid crystal orientation capability by being irradiated with polarized ultraviolet light.

5. The liquid crystal display device according to claim 4, wherein the polyamide acid ester contains a cyclobutane ring.

6. The liquid crystal display device according to claim 1, comprising
an electrode group for applying an electric field to the liquid crystal layer, and
a plurality of active elements connected to the electrode group.

7. An orientation film material comprising a polyimide precursor having two or more components containing a polyamide acid and a polyamide acid ester, wherein, in the polyimide precursor, when an octanol-water partition coefficient is defined as log P, log P of the polyamide acid is defined as log P(A), log P of the polyamide acid ester is defined as log P(E), and the difference between log P(A) and log P(E) is defined as Δ log P, the relational expression 1.20<Δ log P<2.50 is satisfied,
wherein the polyamide acid and the polyamide acid ester include a structure the following chemical formula (1);

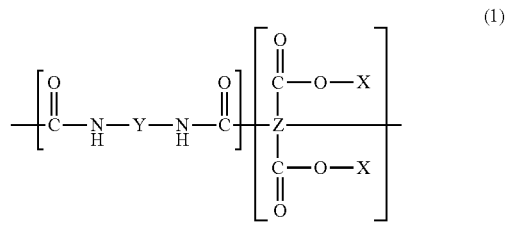

(1)

X represents a hydrogen atom or an alkyl group, Y represents a divalent organic group, and Z represents a tetravalent organic group; and
the polyamide acid ester contains the following chemical formula (Z4) as Z of the above chemical formula (1)

(Z4)

8. The orientation film material according to claim 7, wherein the relational expression 1.30<Δ log P<2.00 is satisfied.

9. The orientation film material according to claim 8, wherein the relational expression 1.40<Δ log P<1.80 is satisfied.

10. The orientation film material according to claim 7, wherein the polyamide acid ester contains a cyclobutane ring.

11. The orientation film material according to claim 10, wherein the orientation film material is given a liquid crystal orientation capability by being irradiated with polarized ultraviolet light.

12. The orientation film material according to claim 7, wherein the blend ratio of the polyamide acid and the polyamide acid ester is in the range of 10/90 to 90/10.

13. The liquid crystal display device according to claim 1, wherein;
   the orientation film includes an upper layer contacting the liquid crystal layer and a lower layer; and
   the upper layer comprises a polyimide immunized from the first compound.

* * * * *